United States Patent
Kee et al.

(10) Patent No.: US 12,072,426 B2
(45) Date of Patent: Aug. 27, 2024

(54) TIME-DIFFERENCED CARRIER PHASE MEASUREMENT VALUE-BASED NAVIGATION SYSTEM, AND POSITION MEASUREMENT METHOD

(71) Applicant: SEOUL NATIONAL UNIVERSITY R&DB FOUNDATION, Seoul (KR)

(72) Inventors: Chang Don Kee, Seoul (KR); Junesol Song, Uiwang-si (KR); O Jong Kim, Seoul (KR); Jungbeom Kim, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 142 days.

(21) Appl. No.: 17/782,128

(22) PCT Filed: Feb. 24, 2020

(86) PCT No.: PCT/KR2020/002623
§ 371 (c)(1),
(2) Date: Jun. 2, 2022

(87) PCT Pub. No.: WO2021/112331
PCT Pub. Date: Jun. 10, 2021

(65) Prior Publication Data
US 2022/0397684 A1   Dec. 15, 2022

(30) Foreign Application Priority Data
Dec. 3, 2019 (KR) .......... 10-2019-0159067

(51) Int. Cl.
*G01S 19/44* (2010.01)
*G01S 19/42* (2010.01)
*G01S 19/51* (2010.01)

(52) U.S. Cl.
CPC ............ *G01S 19/44* (2013.01); *G01S 19/426* (2013.01); *G01S 19/51* (2013.01)

(58) Field of Classification Search
CPC ......... G01S 19/44; G01S 19/426; G01S 19/51
(Continued)

(56) References Cited

U.S. PATENT DOCUMENTS

| 6,317,242 B1* | 11/2001 | Ozeki | H04B 10/801 398/164 |
| 2016/0377736 A1* | 12/2016 | Zeitzew | G01S 19/43 342/357.34 |

FOREIGN PATENT DOCUMENTS

| JP | 2014-190826 A | 10/2014 |
| KR | 10-2014-0002137 A | 1/2014 |

(Continued)

OTHER PUBLICATIONS

Cho, MinGyou et al., "A Precise Heave Determination System Using Time-Differenced GNSS Carrier Phase Measurements," Journal of Positioning, Navigation, and Timing, 2017, vol. 6, No. 3, pp. 149-157.
Kim, Yeonsil, "A Study on Cycle Slip Detection of Single Frequency GNSS Receiver using Low Cost INS," Seoul National University, 2016, Doctoral dissertation, 267 pages (with English abstract).

(Continued)

*Primary Examiner* — Bo Fan
(74) *Attorney, Agent, or Firm* — Fenwick & West LLP

(57) ABSTRACT

A time-differenced carrier phase (TDCP) measurement value-based navigation system according to one embodiment of the present disclosure comprises: a satellite navigation system information reception unit for acquiring satellite navigation system information including a carrier phase measurement value; an initial position determination unit for determining an initial position of a target on the basis of the satellite navigation system information; a TDCP acquisition unit for acquiring a TDCP measurement value; a (Continued)

relative position determination unit for determining a relative position of the target on the basis of the TDCP measurement value; and an absolute position determination unit for determining an absolute position of the target by accumulating relative positions according to time of the initial position of the target. Therefore, time and expenses required for determining integer ambiguity can be reduced, and precise position of a cm-level error can be measured by using a low-cost satellite navigation system information receiver.

13 Claims, 10 Drawing Sheets

(58) Field of Classification Search
USPC ...... 342/352, 381, 128, 440, 357.23, 357.34
See application file for complete search history.

(56) References Cited

FOREIGN PATENT DOCUMENTS

| KR | 10-2019-0050157 A | 5/2019 |
|----|-------------------|--------|
| KR | 10-2019-0093817 A | 8/2019 |

OTHER PUBLICATIONS

PCT International Search Report and Written Opinion, PCT Application No. PCT/KR2020/002623, Oct. 14, 2020, 12 pages (with English translation of PCT International Search Report).

European Patent Office, Extended European Search Report, European Patent Application No. 20895334.9, Dec. 6, 2023, nine pages.

Karaim, M. O. et al. "Real-Time Cycle-Slip Detection and Correction for Land Vehicle Navigation Using Inertial Aiding." Proceedings of the 26th International Technical Meeting of the ION Satellite, Sep. 16-20, 2013, pp. 1290-1298.

* cited by examiner

TIME-DIFFERENCED CARRIER PHASE MEASUREMENT VALUE-BASED NAVIGATION SYSTEM, AND POSITION MEASUREMENT METHOD

TECHNICAL FIELD

The present disclosure relates to a time-differenced carrier phase (TDCP) measurement-based navigation system and a position measurement method, and more particularly, to a navigation system for precisely measuring the position of a target in a deep urban environment using TDCP measurements and a position measurement method.

BACKGROUND ART

A Global Navigation Satellite System (GNSS) is a satellite navigation system which determines a user's current position by receiving a signal from a satellite and calculating the distance between a receiver and the satellite. The positioning system of the satellite navigation system is primarily used in navigation devices for aircraft, vessels and vehicles, and recently, is being used in position based services offered by smartphones.

According to a positioning algorithm using the existing satellite navigation system information receiver, it has the positioning accuracy of about 2 to 10 m error when receiving only a direct signal without distortion in an open environment. Additionally, when correction information such as a signal error component calculated from a reference station is received, the error may be reduced down to about 1 m or less (see FIG. 1A). However, in a deep urban environment, the error in measurements may be increased to 100 m or more by signal blockage or distortion due to buildings, resulting in a significant reduction in accuracy (see FIG. 1B).

The satellite navigation system information receiver such as a GNSS or a Global Positioning System (GPS) receiver may be classified into a low-cost (common) receiver and a high-cost (special) receiver according to the price and function. In general, the low-cost satellite navigation system information receiver determines the navigation solution (the current position) using pseudo-range measurements and is used in vehicle navigation systems and smartphones due to its comparatively low price. The high-cost satellite navigation system information receiver determines a target's position using carrier phase measurements and is used for precise positioning, for example, metering and measurement equipment.

When compared with carrier phase measurements, pseudo-range measurements can obtain absolute value information, but measurement noise is as large as a few m level. In contrast, noise of carrier phase measurements is a few cm or less which is a much smaller level of error than pseudo-range measurements, but due to including the integer ambiguity term that is difficult to estimate values, it is difficult to know the absolute size.

The carrier phase measurement includes the distance between the satellite navigation system satellite and the user and an arbitrary integer, and to calculate the user's accurate position, it is necessary to determine the integer ambiguity which is an arbitrary integer. There are many methods for determining the integer ambiguity, but in general, a considerable amount of time and complex calculation is required. Additionally, when there is no correction information received from the reference station, it is more difficult to determine the integer ambiguity rapidly and accurately. In particular, to determine the integer ambiguity of the moving target such as a vehicle, a more complex calculation process is required. Additionally, in a deep urban environment, a signal disconnection phenomenon may frequently occur, and each time a signal disconnection phenomenon occurs, determining the initialized new integer ambiguity requires very high computational complexity.

Even when mounted in smartphones or vehicle navigation systems, the low-cost satellite navigation system information receiver can receive carrier phase measurements, but by the above-described reason, its performance is insufficient to accurately determine the integer ambiguity. Accordingly, the position is determined using pseudo-range measurements without directly using carrier phase measurements. The pseudo-range measurements do not include integer ambiguity and only include the distance between the satellite and the user, and thus the calculation process is comparatively straightforward. However, due to the extremely serious influence of signal distortion in a deep urban environment, the pseudo-range measurement may include a measurement error of a few hundreds of m and has a large noise level of m level.

The carrier phase measurements are robust against signal distortion in a deep urban environment and may have a small noise level of mm level, but as described above, it is difficult for dynamic users to determine the integer ambiguity and calculation requires lots of time and costs. Accordingly, in general, all the low-cost and high-cost satellite navigation system information receivers that perform navigation operation alone without reference station correction information in a deep urban environment use pseudo-range measurements as main measurements, and as shown in FIG. 2, a severe level of error occurs. In FIG. 2, P indicates the target's movement trajectory tracked by the low-cost satellite navigation system information receiver, and C indicates the target's movement trajectory tracked by the high-cost satellite navigation system information receiver. The high-cost satellite navigation system information receiver has a smaller error than the low-cost satellite navigation system information receiver, but still shows an m level of error.

In particular, in the autonomous vehicle technology gaining attention in recent years, precise positioning with an error of 1 m or less (criterion for lane detection) is essential. For the use in autonomous vehicle applications, positioning systems having higher processing rate and higher accuracy than the existing systems are required.

DISCLOSURE

Technical Problem

The present disclosure is designed to solve the problems of the existing satellite navigation systems (very low accuracy in determining the position using pseudo-range measurements in a deep urban environment, low usefulness due to the time and cost required to calculate the integer ambiguity when determining the position using carrier phase measurements, etc.).

The present disclosure is directed to providing a new navigation system for precisely measuring the position of a target using time-differenced carrier phase (TDCP) measurements without determining the integer ambiguity.

Technical Solution

To achieve the above-described object, a time-differenced carrier phase (TDCP) measurement-based navigation system according to an embodiment includes a satellite navigation system information reception unit to acquire satellite navigation system information including carrier phase measurement; an initial position determination unit to determine an initial position of a target based on the satellite navigation system information; a TDCP acquisition unit to acquire TDCP measurement by time-differencing the carrier phase measurement between consecutive times; a relative position determination unit to determine a relative position of the target based on the TDCP measurement; and an absolute position determination unit to determine an absolute position of the target by accumulating the relative position over time from the initial position of the target.

In an embodiment, the system may further include an integer ambiguity change detection unit to detect a change of integer ambiguity in the carrier phase measurement.

In an embodiment, when the change of integer ambiguity in the carrier phase measurement is detected, the relative position determination unit may exclude the carrier phase measurement and its time-differenced measurement in determining the relative position.

In an embodiment, when the change of integer ambiguity in the carrier phase measurement is detected, the relative position determination unit may be configured to estimate a magnitude of the change of integer ambiguity and compensate the measurement for the corresponding magnitude for use to determine the relative position.

In an embodiment, the system may further include a confidence level determination unit to determine a confidence level for the determined relative position or absolute position of the target based on the TDCP measurement.

In an embodiment, the system may further include an additional information reception unit to acquire additional information other than the satellite navigation system information, and the initial position determination unit may determine the initial position of the target further based on the additional information.

In an embodiment, the system may further include an additional information reception unit to acquire additional information other than the satellite navigation system information, and the relative position determination unit may determine the relative position of the target further based on the additional information.

In an embodiment, the system may further include an additional information reception unit to acquire additional information other than the satellite navigation system information, and the confidence level determination unit may determine the confidence level for the relative position or the absolute position of the target further based on the additional information.

In an embodiment, the system may further include an additional information reception unit to acquire additional information other than the satellite navigation system information, and the integer ambiguity change detection unit may detect the change of integer ambiguity in the carrier phase measurement based on the additional information.

In an embodiment, the system may further include an additional information reception unit to acquire additional information other than the satellite navigation system information, and the relative position determination unit may estimate a magnitude of the change of integer ambiguity based on the additional information.

In an embodiment, the additional information may include at least one of DR information received from a DR sensor, visual information received from a vision sensor, radio wave positioning information received from a radio wave positioning sensor or correction information received from a reference station.

In an embodiment, the satellite navigation system information may include multi-frequency information and multi-constellation information.

A TDCP measurement-based navigation system according to another embodiment includes a satellite navigation system information reception unit to acquire satellite navigation system information including carrier phase measurement; an initial position determination unit to determine an initial position of a target based on the satellite navigation system information; a TDCP acquisition unit to acquire TDCP measurement by time-differencing the carrier phase measurement between consecutive times; a relative measurement calculation unit to calculate relative measurement over time based on the TDCP measurement; and a current position determination unit to determine a current position of the target based on the initial position of the target and the relative measurement accumulated over time.

A TDCP measurement-based position measurement method according to still another embodiment includes determining an initial position of a target; acquiring TDCP measurement by time-differencing carrier phase measurement received through a satellite navigation system information reception unit between consecutive times; determining a relative position of the target based on the TDCP measurement; and determining an absolute position of the target by accumulating the relative position of the target over time from the initial position of the target.

In an embodiment, the method may further include detecting a change of integer ambiguity in the carrier phase measurement before determining the relative position of the target, and when the change of integer ambiguity in the carrier phase measurement is detected, the carrier phase measurement and its time-differenced measurement may be excluded in determining the relative position of the target.

In an embodiment, the method may further include detecting a change of integer ambiguity in the carrier phase measurement before determining the relative position of the target, and when the change of integer ambiguity in the carrier phase measurement is detected, the method may further include estimating a magnitude of the change of integer ambiguity and compensating the measurement for the corresponding magnitude.

In an embodiment, the method may further include determining a confidence level for the determined relative position or absolute position of the target based on the TDCP measurement.

In an embodiment, the method may further include acquiring additional information other than the satellite navigation system information, and the additional information may include at least one of DR information received from a DR sensor, visual information received from a vision sensor, radio wave positioning information received from a radio wave positioning sensor or correction information received from a reference station.

In an embodiment, each of the step of determining the initial position of the target, the step of determining the relative position of the target, the step of detecting the change of integer ambiguity, the step of determining the confidence level for the relative position or the absolute position of the target and the step of estimating the magnitude of the change of integer ambiguity may be performed further using the additional information.

Advantageous Effects

According to an embodiment of the present disclosure, the absolute position (the current position) of the target may be determined by acquiring time-differenced carrier phase (TDCP) measurements by time-differencing carrier phase measurements between consecutive times, and computing the cumulative sum of the relative position from the initial position of the target using the TDCP measurements. Since the integer ambiguity included in the carrier phase measurements is an integer that is irrelevant to the change in time, the use of changes in measurements over time makes it possible to make use of carrier phase measurements without calculating the integer ambiguity.

According to this system, in addition to the use of carrier phase measurements having a smaller error than pseudo-range measurements, as opposed to the existing systems, it is possible to reduce the time and cost required to determine the integer ambiguity, thereby achieving a more economical and precise positioning system.

BEST MODE

Figure 1A:
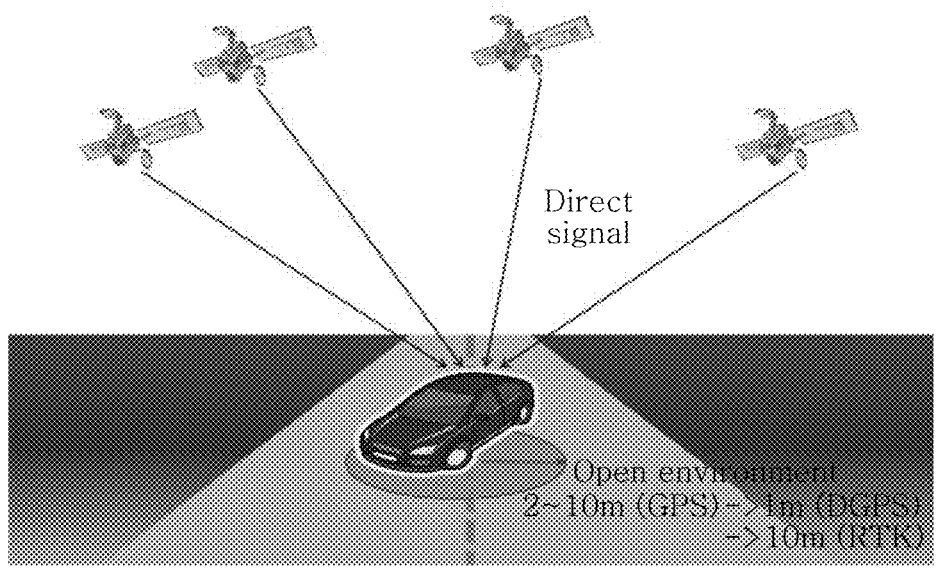
FIGS. 1A and 1B are diagrams showing a comparison of position measurement error in an open environment and a deep urban environment.
Figure 1B:
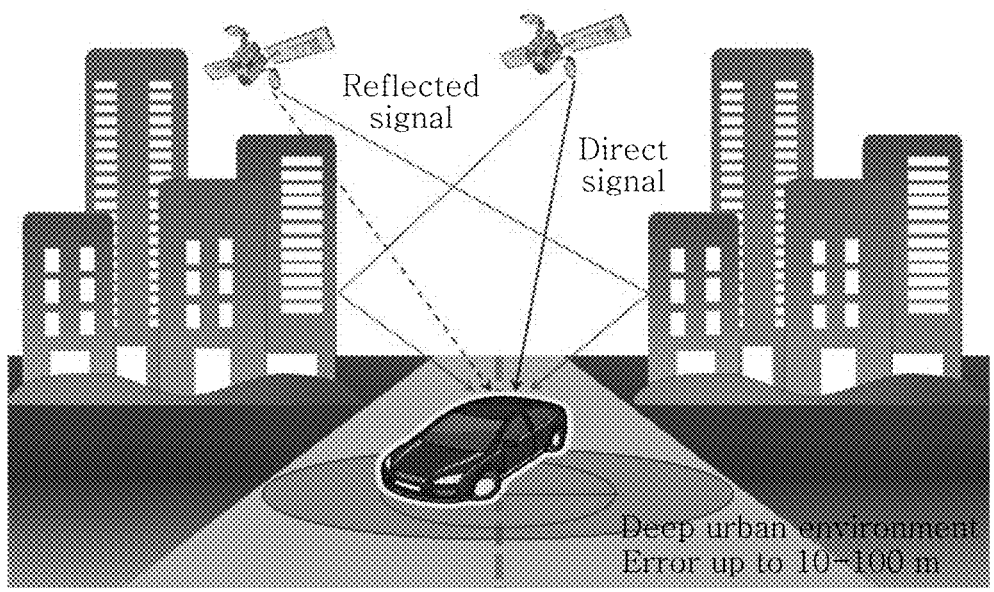
Figure 2:
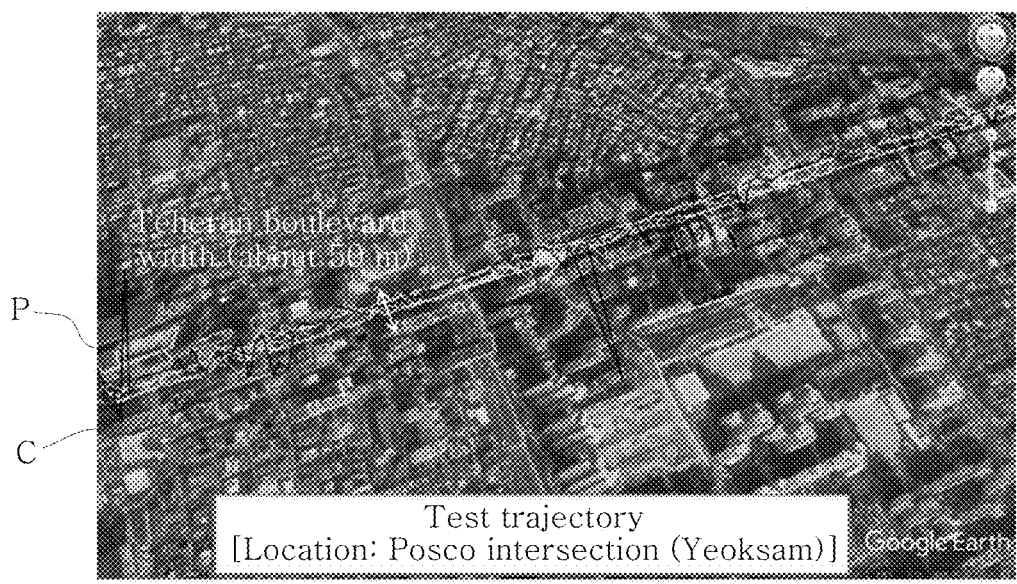
FIG. 2 is a diagram showing a movement trajectory of a target tracked using a high-cost satellite navigation system information receiver and a low-cost satellite navigation system information receiver in a deep urban environment.

The terms as used herein are general terms selected as those being now used as widely as possible in consideration of functions, but they may vary depending on the intention of those skilled in the art or the convention or the emergence of new technology. Additionally, in certain cases, there may be terms arbitrarily selected by the applicant, and in this case, the meaning will be described in the corresponding description part of the specification. Accordingly, it should be noted that the terms as used herein should be interpreted based on the substantial meaning of the terms and the context throughout the specification, rather than simply the name of the terms.

Additionally, the embodiment described herein may have aspects of entirely hardware, partly hardware and partly software, or entirely software. The term "unit", "module", "device", "server" or "system" used herein refers to computer related entity such as hardware, software or a combination thereof. For example, the unit, module, device, server or system may refer to hardware that makes up a platform in part or in whole and/or software such as an application for operating the hardware.

Some of the embodiments of the present disclosure are described with reference to the flowchart presented in the drawings. Although the method is shown and illustrated as a series of blocks for brevity, the present disclosure is not limited to the order or sequence of the blocks, and some blocks may operate in a different order or sequence from the order or sequence shown and illustrated herein or may operate concurrently with other blocks, and a variety of other branches, flow paths and blocks for achieving the identical or similar result may be implemented. Additionally, all the blocks shown in the drawings may not be required to implement the method described herein. Further, the method according to an embodiment of the present disclosure may be implemented in the form of a computer program for performing a series of processes, and the computer program may be recorded in computer readable recording media.

Hereinafter, embodiments will be described in detail with reference to the accompanying drawings and the context described in the accompanying drawings, but the claimed scope is not restricted or limited by the embodiments.

Time-Differenced Carrier Phase (TDCP) Measurement-Based Navigation System

Figure 3:
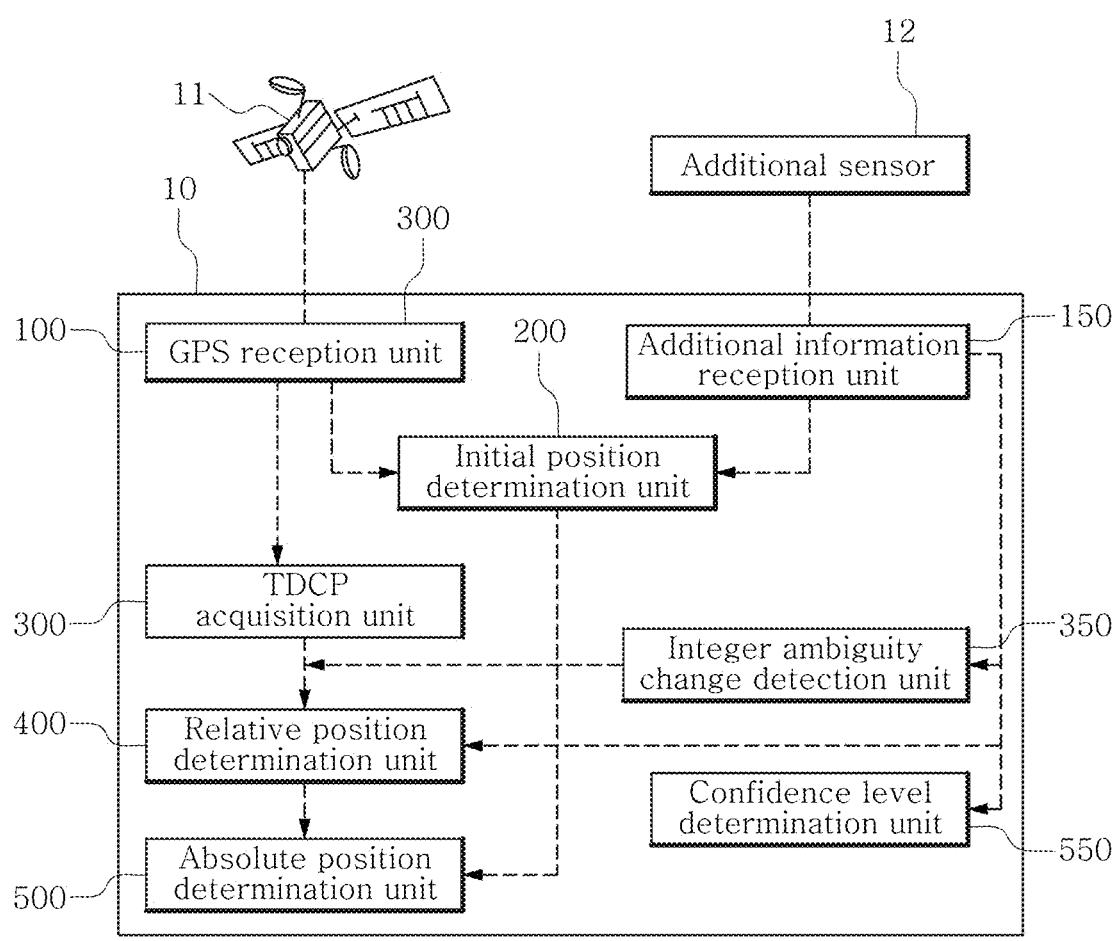
FIG. 3 is a block diagram showing the architecture of a time-differenced carrier phase (TDCP) measurement-based navigation system according to an embodiment.

FIG. 3 is a block diagram showing the architecture of a TDCP measurement-based navigation system according to an embodiment.

Referring to FIG. 3, the navigation system 10 according to an embodiment may include a satellite navigation system information reception unit 100 to acquire satellite navigation system information including carrier phase measurement from a satellite 11, an additional information reception unit 150 to acquire additional information other than the satellite navigation system information through an additional sensor 12, an initial position determination unit 200 to determine a target's initial position based on the satellite navigation system information and the additional information, a TDCP acquisition unit 300 to acquire TDCP measurement, an integer ambiguity change detection unit 350 to detect a change of integer ambiguity in the carrier phase measurement, a relative position determination unit 400 to determine the target's relative position based on the TDCP measurement, an absolute position determination unit 500 to determine the target's absolute position by accumulating the relative position over time from the initial position, and a confidence level determination unit 550 to determine a confidence level for the target's relative position or absolute position based on TDCP.

The satellite navigation system information reception unit 100 is configured to receive the satellite navigation system information from the satellite 11. As described above, the satellite navigation system information receiver may be classified into a low-cost receiver that determines the navigation solution (the position) using pseudo-range measurements and a high-cost receiver that uses carrier phase measurements and includes an integer ambiguity determination system, according to the price and function. In general, to make use of carrier phase measurements, it is necessary to determine the integer ambiguity, and this process requires a large amount of time and costs. Accordingly, the existing vehicle navigation systems or smartphones are usually equipped with low-cost receivers and determine the position using pseudo-range measurements.

In an embodiment of the present disclosure, the target's position is determined using the low-cost satellite navigation system information receiver but using TDCP measurements rather than pseudo-range measurements. According to an embodiment, the target's current position is determined by determining the relative position with changes in carrier phase measurements over time and accumulating the relative position, and thus it is possible to use the low-cost satellite navigation system information receiver having no system for determining the integer ambiguity.

The additional information reception unit 150 is a component for acquiring the additional information other than the satellite navigation system information, and receives the additional information (acceleration, angular velocity, travel distance information, image information, etc.) through the additional sensor 12 such as a dead reckoning (DR) sensor (an accelerometer, a gyroscope, an odometer, an altimeter, a geomagnetic sensor, etc.), a vision sensor (a camera, light detection and ranging (Lidar), Radar, etc.) and a radio wave positioning sensor (long-term evolution (LTE), wireless fidelity (WiFi), etc.).

The initial position determination unit 200 is configured to determine the target's initial position and the confidence level based on the satellite navigation system information acquired by the satellite navigation system information reception unit 100 and/or the additional information acquired by the additional information reception unit 150. Here, the satellite navigation system information may include all information that may be outputted using the common satellite navigation receiver, for example, Differential GPS (DGPS), Carrier DGPS (CDGPS), Real Time Kinematic (RTK), Network-RTK, Precise Point Positioning (PPP), etc.

In addition to the satellite navigation system information, the initial position determination unit 200 according to an embodiment may determine the target's absolute position using the information acquired through the vision sensor, for example, a camera, Lidar, Radar or map information or a radio wave signal acquired from the radio wave positioning sensor, for example, LTE, WIFI, and determine the more accurate initial position and confidence level by combining the above-described information.

The TDCP acquisition unit 300 is configured to acquire the Time Differenced Carrier Phase (TDCP) measurement by time-differencing the carrier phase measurement outputted from the satellite navigation system information reception unit 100 between consecutive times. Here, the TDCP measurement is the same concept as a change in carrier phase measurement over time.

The following equation is a numerical expression of the pseudo-range measurement and the carrier phase measurement.

$$\rho_u^i = d_u^i + B_u + T_u^i + I_u^i - b^i + M_u^i + \varepsilon_{\rho,u}^i = (\bar{r}^i + \delta \bar{r}^i - \bar{r}_u) \cdot \bar{e}_u^i + B_u + T_u^i + I_u^i - b^i + M_u^i + \varepsilon_{\rho,u}^i$$ [Equation 1]

$$\phi_u^i = d_u^i + B_u + T_u^i - I_u^i - b^i + m_u^i + \varepsilon_{\phi,u}^i + \lambda N_u^i = (\bar{r}^i + \delta \bar{r}^i - \bar{r}_u) \cdot \bar{e}_u^i + B_u + T_u^i - I_u^i - b^i + m_u^i + \varepsilon_{\phi,u}^i + \lambda N_u^i$$ [Equation 2]

In the above equation, $\rho_u^i$ denotes the pseudo-range measurement for the $i^{th}$ satellite, denotes the carrier phase measurement for the $i^{th}$ satellite, d denotes the distance between the satellite and the user, r denotes the position of the $i^{th}$ satellite, $\bar{r}^i$ denotes the absolute position of the user (the target), $\delta \bar{r}^i$ denotes the $i^{th}$ satellite orbit error, $\bar{e}^i$ denotes a line of sight vector of the $i^{th}$ satellite, B denotes the receiver field of view error, T denotes the troposphere, I denotes the ionosphere, b denotes the satellite field of view, N denotes the integer ambiguity, $\lambda$ denotes the wavelength of carrier wave, M denotes the pseudo-range multipath error, m denotes the carrier phase multipath error, $\varepsilon_\rho$ denotes pseudo-range receiver noise, and $\varepsilon_\phi$ denotes carrier phase receiver noise.

In general, the pseudo-range multipath error M may increase up to a few hundreds of meters, and by contrast, the carrier phase multipath error m shows a much smaller level of up to 4-5 cm. Additionally, the carrier phase receiver noise $\varepsilon_\phi$ shows a much smaller level than the pseudo-range receiver noise $\varepsilon_\rho$. That is, the carrier phase measurement may obtain high positioning accuracy due to the multipath error and the receiver noise that is smaller than the pseudo-range measurement. Due to the integer ambiguity N, however, a high-cost system and error component correction information is required.

The present disclosure proposes a relative navigation method using time-differenced carrier phase measurements. According to this, it is possible to achieve a high accuracy navigation system using a low-cost receiver without needing to determine the integer ambiguity.

The TDCP measurement may be calculated by time-differencing Equation 2 as below (assume $\bar{e}_u^i(t_1) \approx \bar{e}_u^i(t_2)$).

$$\Delta_t \phi_u^i = \phi_u^i(t_2) - \phi_u^i(t_1) = (\Delta_t \bar{r}^i + \Delta_t \delta \bar{r}^i - \Delta_t \bar{r}_u) \cdot \bar{e}_u^i + \Delta_t B_u + \Delta_t T_u^i - \Delta_t I_u^i - \Delta_t b^i + \Delta_t \varepsilon_{\phi u}^i$$ [Equation 3]

In the above Equation 3, the term including integer ambiguity is eliminated through time-differencing. The acquired TDCP value is used to determine the relative position of the target (the user) through the following process.

The system 10 according to an embodiment may further include the integer ambiguity change detection unit 350 to detect a change of integer ambiguity in the carrier phase measurement. To use the TDCP measurement, the continuity of integer ambiguity over time should be guaranteed, and this is because the integer ambiguity is eliminated by time-differencing on the premise that the integer ambiguity term has a constant value that is time-invariant.

The integer ambiguity change detection unit 350 is configured to detect a discontinuity in the measurement (a cycle slip). When a change of integer ambiguity occurs, a bias error exists, causing the continuous decrease in positioning accuracy. When the change of integer ambiguity is detected, the integer ambiguity change detection unit 350 may determine the relative position using only the measurement from the remaining satellites with the exclusion of the corresponding measurement from the subsequent relative position determination process, or may use the corresponding measurement after estimating and compensating the magnitude of change of integer ambiguity. Accordingly, it is possible to improve the reliability of the position estimation algorithm.

In an embodiment, to estimate the magnitude of change of integer ambiguity, many additional information (DR information received from the DR sensor, visual information received from the vision sensor, radio wave positioning information received from the radio wave positioning sensor, and correction information received from the reference station, etc.) may be used.

Figure 9:
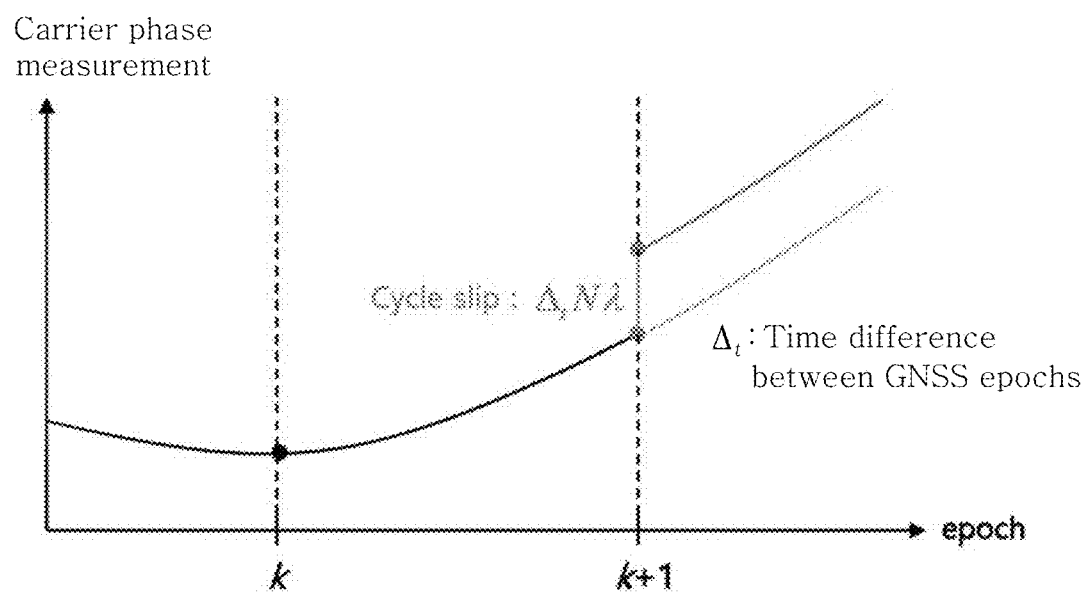
FIG. 9 is a graph illustrating that a change of integer ambiguity is detected in a TDCP measurement-based navigation system according to an embodiment.

Referring to the graph of FIG. 9, a phenomenon occurs in which the carrier phase measurement becomes discontinuous due to the change of integer ambiguity (k+1), and the corresponding measurement may be used after estimating and compensating the magnitude of change of integer ambiguity. In this case, it is expected to improve the navigation performance with the increasing visible satellites.

In an embodiment, in addition to the output signal of the satellite navigation system information receiver, the integer ambiguity change detection unit 350 may detect the change of integer ambiguity using the additional information acquired through the DR sensor (an accelerometer, a gyroscope, an odometer, an altimeter, a geomagnetic sensor, etc.), the vision sensor, the radio wave positioning sensor, etc. In another embodiment, not only single-frequency measurements but also multi-frequency (dual, triple frequency) measurements may be used, and in this case, a difference between measurements (for example, an ionospheric error size difference, etc.) occurs due to the characteristics between frequencies, and using this principle, abnormal measurements may be detected by combining many frequency measurements.

Additionally, the number of visible satellites may be increased using not only single-constellation but also multi-constellation (GPS in the USA, BeiDou in China, GALILEO in Europe, GLONASS in Russia, etc.), and using this, it is possible to prevent a situation in which a change of integer ambiguity is not actually detected. Specifically, Miss Detection (failure to detect a change of integer ambiguity when the change of integer ambiguity occurred) and False Alarm (wrong detection of a change of integer ambiguity when the change of integer ambiguity did not occur) have a tradeoff relationship, and when information received from multi-constellation is used, in the event of False Alarm, since visible satellites suffice, the overall performance may be improved by dense setup to avoid Miss Detection. However, to use multi-frequency, multi-constellation information, a frequency difference between measurements should be considered.

The relative position determination unit 400 is configured to determine the target's relative position based on the TDCP measurement. Using the TDCP measurement calculated from the above Equation 3, the following navigation equation may be obtained.

$$\Delta_t \bar{r}_u \cdot \bar{e}_u^i - \Delta_t B_u = \Delta_t \bar{r}^i \cdot \bar{e}_u^i - \Delta_t \phi_u^i + \Delta_t E_u^i \quad \text{[Equation 4]}$$

$$\begin{bmatrix} \bar{e}_u^1 & -1 \\ \vdots & \vdots \\ \bar{e}_u^m & -1 \end{bmatrix} \begin{pmatrix} \Delta_t \bar{r}_u \\ \Delta_t B_u \end{pmatrix} = \begin{bmatrix} \Delta_t \bar{r}^1 \cdot \bar{e}_u^1 - \Delta_t \phi_u^1 + \Delta_t E_u^1 \\ \vdots \\ \Delta_t \bar{r}^m \cdot \bar{e}_u^m - \Delta_t \phi_u^m + \Delta_t E_u^m \end{bmatrix}$$

$$\Delta_t \bar{r}_u \cdot {}^i\nabla^R \bar{e}_u = {}^i\nabla^R \Delta_t \bar{r} \cdot \bar{e}_u - {}^i\nabla^R \Delta_t \phi_u + {}^i\nabla^R \Delta_t E_u \quad \text{[Equation 5]}$$

$$\begin{bmatrix} {}^1\nabla^R \bar{e}_u^1 \\ \vdots \\ {}^{m-1}\nabla^R \bar{e}_u^1 \end{bmatrix} (\Delta_t \bar{r}_u) = \begin{bmatrix} {}^1\nabla^R \Delta_t \bar{r} \cdot \bar{e}_u & {}^1\nabla^R \Delta_t \phi_u + {}^1\nabla^R \Delta_t E_u \\ \vdots \\ {}^{m-1}\nabla^R \Delta_t \bar{r} \cdot \bar{e}_u & {}^{m-1}\nabla^R \Delta_t \phi_u + {}^{m-1}\nabla^R \Delta_t E_u \end{bmatrix}$$

In Equation 4, $\Delta_t E_u^i = \Delta_t T_u^i - \Delta_t I_u^i - \Delta_t b^i + \Delta_t \varepsilon_u^i + \Delta_t \delta \bar{r}^i \cdot \bar{e}_u^i$ may be written. Equation 5 is an equation using the satellite difference. The superscript R indicates the reference satellite, and the corresponding equation is expressed as $\Delta z = H \Delta X$. The following equation for determining the relative position may be calculated from Equation 4 or 5.

$$\Delta_t \bar{r}_u = (H^T H)^{-1} H^T \Delta z \quad \text{[Equation 6]}$$

Figure 4:
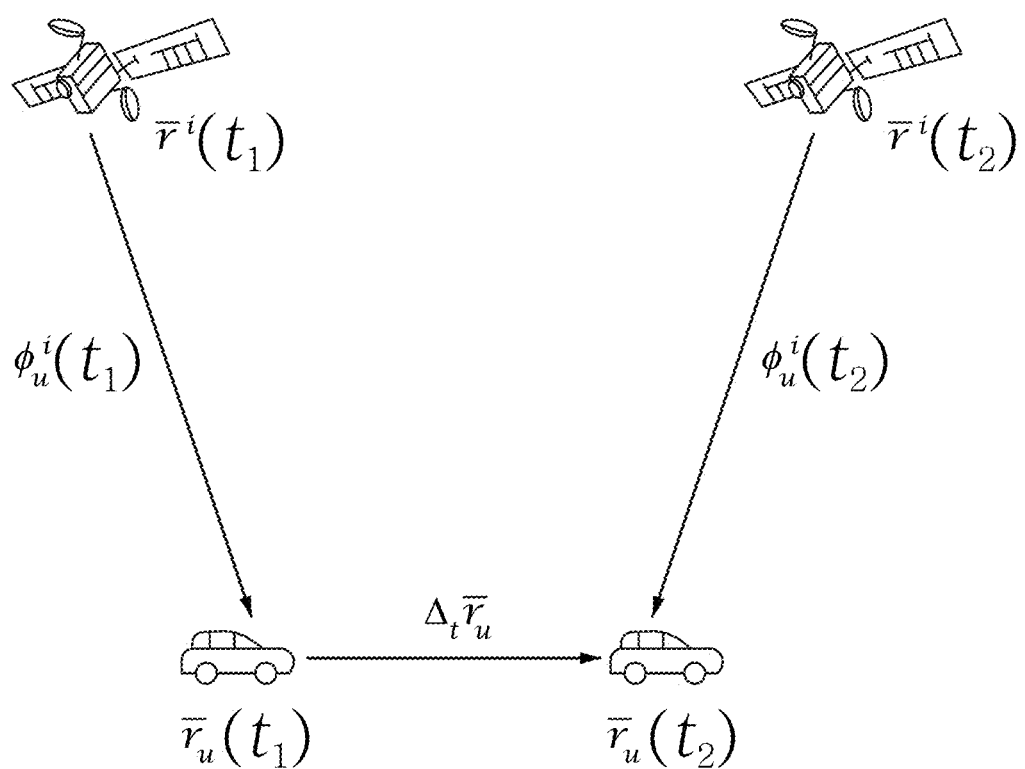
FIG. 4 is a diagram illustrating a concept of determining a relative position of a target in a navigation system according to an embodiment.

FIG. 4 is a diagram illustrating a process of calculating the relative position of the target in the navigation system according to an embodiment. As shown in FIG. 4, a value corresponding to a difference between the position of the target (the user) at $t_1$ and the position of the target at $t_2$, i.e., a movement distance, may be calculated.

According to the algorithm of the present disclosure, it is possible to achieve precise relative position calculation with cm level of error using only the low-cost satellite navigation receiver using the single-frequency, single-constellation information without any assistance of a correction information system.

Additionally, it is possible to improve the positioning accuracy by receiving the correction information from the reference station or the multi-frequency information or multi-satellite information.

According to an embodiment, the use of the correction information (Satellite-Based Augmentation System (SBAS), Network-RTK, PPP, etc.) of the reference station may further improve the positioning accuracy. The error in the TDCP measurement-based relative position is affected by changes in satellite navigation error components, and especially changes in ionospheric and tropospheric errors act as the most major causes of errors, and when the correction information of the reference station is used, it is possible to remove the errors, thereby achieving more precise positioning.

Further, using the multi-frequency measurement, it is possible to estimate and remove the tropospheric error without the correction information of the reference station, thereby improving the accuracy of the relative position, and when the number of visible satellites is increased using multi-constellation (USA GPS, Chinese BeiDou, European GALILEO, Russian GLONASS, etc.), Dilution of Precision ((DOP); uniformity of visible satellite distribution) decreases, thereby improving the positioning accuracy (in this case, a frequency difference between measurements should be considered).

The use of the additional information is just optional, and basically, the embodiments of the present disclosure can achieve precise relative position calculation with cm level of error using only the low-cost satellite navigation receiver using the single-frequency, single-constellation information without any assistance of a correction information system.

The absolute position determination unit 500 determines the target's absolute position by accumulating the relative position over time from the target's initial position. The following equation for determining the absolute position may be obtained based on Equation 6.

$$\bar{r}_u(t) = \bar{r}_u(0) + \Sigma \Delta_t \bar{r}_u \quad \text{[Equation 7]}$$

That is, the absolute position may be determined by accumulating the relative position $\Delta_t \bar{r}_u$ calculated using the TDCP measurement from the initial position $\bar{r}_u(0)$.

According to another embodiment, the relative measurement over time based on the TDCP measurement may be calculated, and the target's current position (the absolute position) based on the target's initial position and the relative measurements accumulated over time may be determined.

In other words, two methods may be selected; a method (embodiment 1) that determines the current position by accumulating the relative position (changes in position) over time from the initial position, and a method (embodiment 2) that determines the current position by calculating and accumulating relative carrier phase measurements over time. As a result of the experiment, it is found that the positioning accuracy according to the two methods is equal.

In an additional embodiment, the accuracy of absolute position measurement may be improved by combining with the additional information received from various types of sensors such as the DR sensor (an accelerometer, a gyroscope, an odometer, an altimeter, a geomagnetic sensor, etc.), the vision sensor (a camera, Lidar, Radar, etc.) and the radio wave positioning sensor (LTE, WIFI, etc.).

The navigation system 10 according to an embodiment may further include the confidence level determination unit 550 to determine the confidence level for the target's relative position or absolute position based on TDCP. The confidence level refers to a probability that a result of iteration produces the same result in the error range, and a warning is provided to the user about a dangerous situation at the time when the calculated result has the confidence level above the threshold, thereby ensuring the user's safety.

In an embodiment, the TDCP measurement-based Relative RAIM (RRAIM) method may be applied as the Receiver Autonomous Integrity Monitoring (RAIM) algorithm of the satellite navigation receiver, and the method is primarily used for aircraft user's vertical takeoff and landing guidance. The RRAIM method may have sufficient performance even in an environment in which visible satellites lack. Accordingly, it is suitable for use in a deep urban environment in which visible satellites may lack due to obstruction by buildings and a variety of disturbing factors.

In the same way as the position determination process, the absolute confidence level may be determined by simply accumulating the confidence level of the relative position measurement from the initial confidence level, and the confidence level may be improved by combining with the additional information acquired from various types of additional sensors, for example, the DR sensor, the vision sensor and the radio wave positioning sensor. In an embodiment, the optimal confidence level may be calculated by combining the accelerometer or gyroscope based estimated position information with the satellite navigation system information using a Kalman filter (a filter primarily used to build an integration navigation system by combining GPS information with INS).

Figure 5:
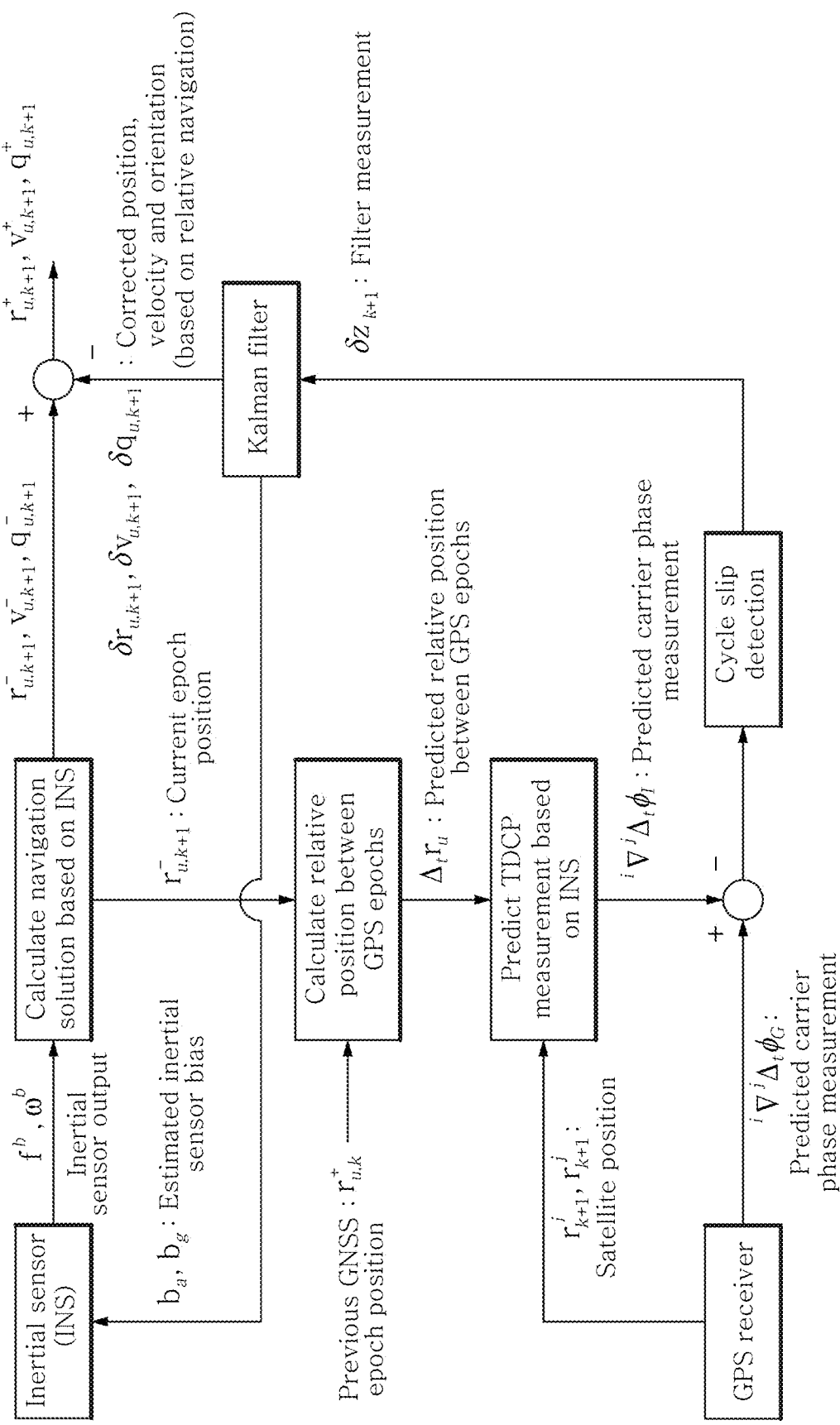
FIG. 5 is a block diagram showing the processing of a navigation system according to an embodiment.

FIG. 5 is a block diagram showing the processing of the TDCP measurement-based navigation system according to an embodiment, and shows the architecture of the TDCP/INS integrated navigation system. FIG. 5 shows a combination of the TDCP measurement and the INS information as the additional information. It is possible to detect and compensate the integer ambiguity in the TDCP measurement through the INS based additional information, and a Kalman Filter may be used to combine the measurement with INS. Through this, finally, it is possible to determine the precise relative position and confidence level.

Using the navigation system according to the embodiments as described above, the relative position may be calculated based on the TDCP measurement and the absolute position may be determined by accumulating the relative position, and thus it is possible to achieve precise position measurement that is robust against an error caused by signal distortion in an urban environment. The existing GPS based position navigation system directly calculates the user's absolute position value based on pseudo-range measurements every cycle, resulting a large error caused by signal distortion in an urban environment. The navigation system of an embodiment can solve this problem.

Additionally, it is possible to achieve relative navigation accuracy having cm level of error without the reference station correction information data. The pseudo-range measurements used by the common satellite navigation system information receiver may have a signal distortion error up to 100 m or more. By contrast, the navigation system of an embodiment may have cm level accuracy by using the carrier phase measurements. When the reference station correction information is used, it is possible to further improve the accuracy as described above.

Figure 6:
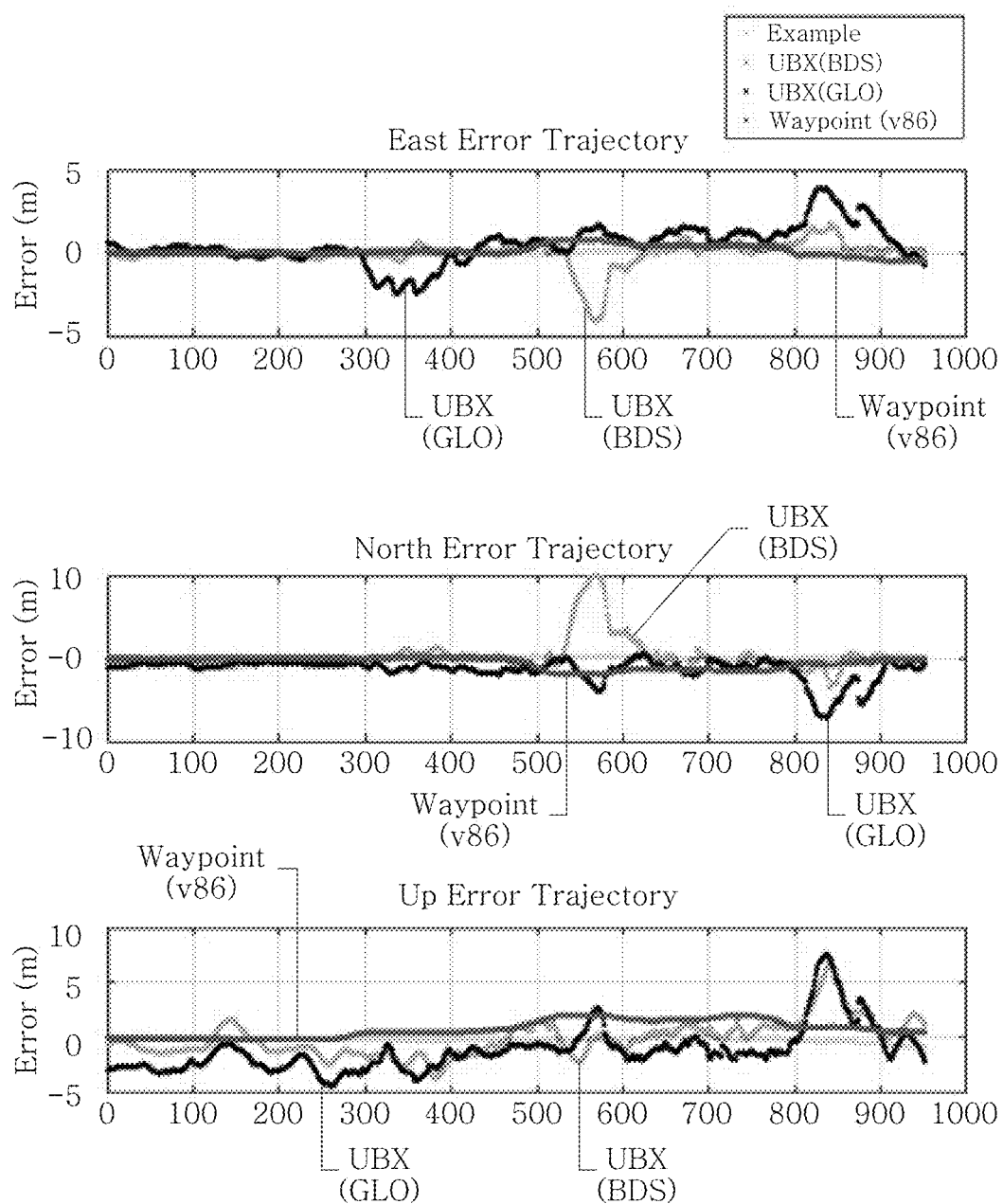
FIG. 6 is a graph for comparison of position measurement performance between a system according to an embodiment and other systems.

FIG. 6 is an experimental result graph showing errors in position measurements using the system according to an embodiment and other systems. Referring to FIG. 6, when comparing the navigation performance between two positioning results (UBX(BDS), UBX(GLO)) using the typical low-cost satellite navigation system information receiver, Ublox's Ublox M8T model, and the positioning result (Waypoint(v86)) using Novatel's high-cost satellite navigation system information receiver and accelerometer/gyroscope data processed using high-cost post-processing software Waypoint as the control group, the navigation system according to an embodiment shows the smallest error as shown, and in particular, shows higher performance than the control group processed through high-cost Novatel's equipment and post-processing software.

Since the existing TDCP measurement-based satellite navigation systems require lots of times and costs to determine the integer ambiguity, the economic reason makes it difficult to use them in vehicle navigation system or smartphone position based services, but according to an embodiment of the present disclosure, the use of the TDCP measurements eliminates the need to determine the integer ambiguity, and accordingly it is possible to calculate the navigation solution using the low-cost satellite navigation system information receiver.

Additionally, in the existing method that determines the absolute position by directly using satellite navigation system measurements, a navigation solution jump (discontinuous trajectory) phenomenon occurs with changes in visible satellites, and according to an embodiment, it is possible to prevent a navigation solution jump phenomenon by using time-differenced measurements instead of directly using satellite carrier phase measurements.

Figure 7:
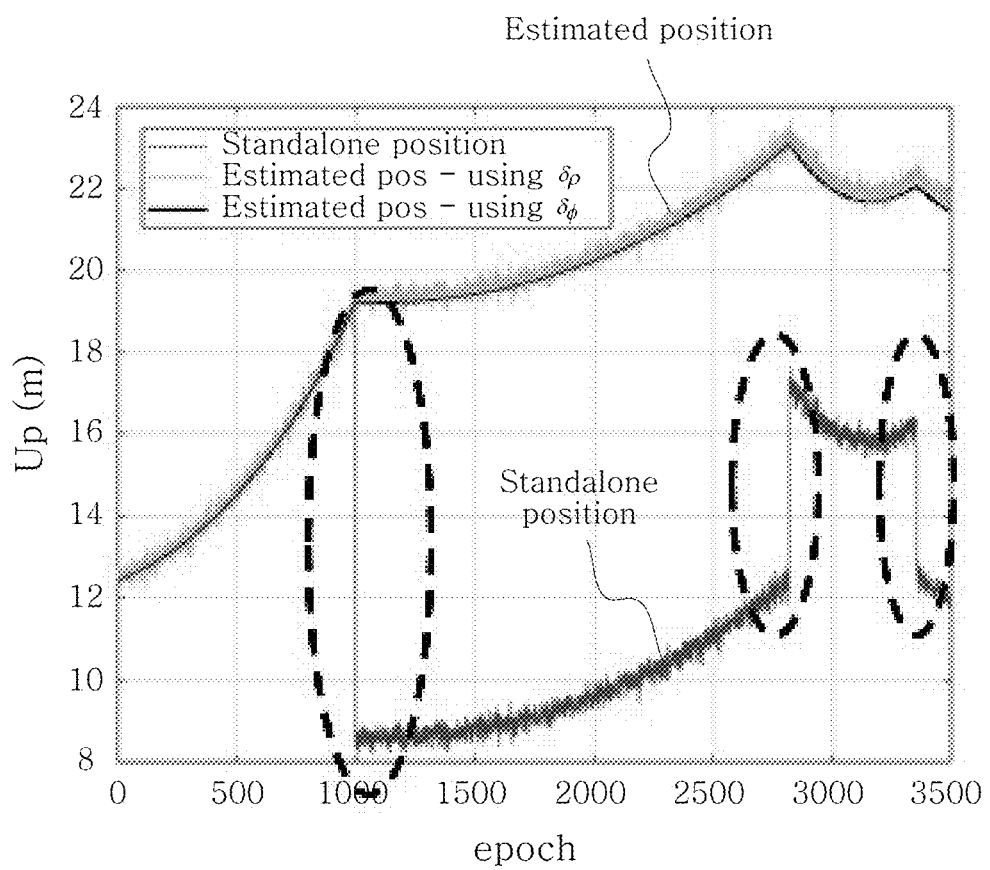
FIG. 7 is a graph illustrating that a navigation solution jump phenomenon does not occur in a navigation system according to an embodiment.

FIG. 7 is a graph illustrating that a navigation solution jump phenomenon does not occur in the navigation system according to an embodiment. As shown in FIG. 7, according to the existing system, a navigation solution jump phenomenon occurs with changes in visible satellites, and when jump occurs, positioning errors tend to change, and thus in case that continuous precise position tracking is important, for example, in the autonomous vehicle technology, it may become critical.

According to an embodiment, since the TDCP measurements are used, as opposed to the existing satellite navigation system based absolute navigation systems, it is possible to prevent a navigation solution jump (a sudden change) phenomenon caused by changes in visible satellites, thereby achieving more stable position tracking.

Meanwhile, in a deep urban environment, visible satellites decrease due to obstacles, for example, buildings, and thus it is difficult to use the integrity monitoring algorithm (RAIM or Advanced RAIM) by the existing satellite navigation systems. The system of the present disclosure monitors integrity using the TDCP measurements by the introduction of the Relative RAIM (RRAIM) algorithm. According to this, it is possible to ensure reliable operations even in an urban environment in which visible satellites lack, thereby improving the positioning precision and the confidence level.

As described above, the navigation system according to an embodiment may determine the position using the satellite navigation system information alone, but may improve the positioning accuracy and reliability by combining the satellite navigation system information with the additional information acquired through various types of additional sensors. Since the navigation system according to an embodiment uses the TDCP measurements as opposed to the existing systems, to achieve the improved results by combining the TDCP measurements with the additional information, it is necessary to select a suitable filter, and for example, a Kalman Filter may be used to determine the optimal position and confidence level considering Noise Correlation.

TDCP Measurement-Based Position Measurement Method

Figure 8:
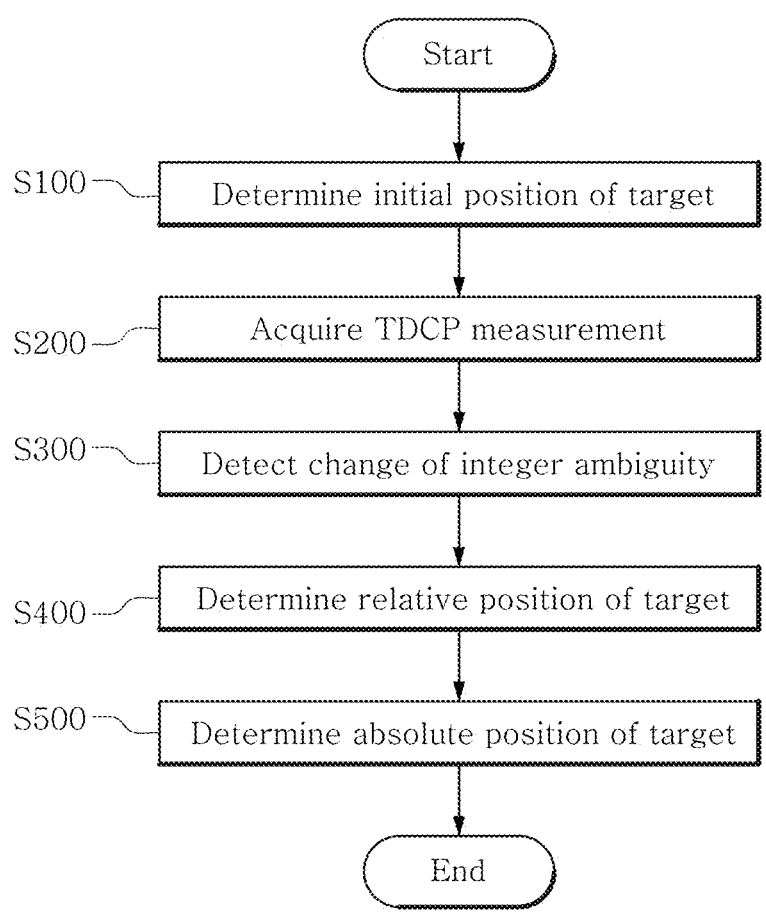
FIG. 8 is a graph illustrating a TDCP measurement-based position measurement method according to an embodiment.

Hereinafter, the TDCP measurement-based position measurement method according to an embodiment will be described with reference to FIG. 8. For concise and clear description, overlapping descriptions with the foregoing description are omitted.

The position measurement method according to an embodiment may be individually performed by a single processor or may be performed stepwise by a plurality of devices or a plurality of processors equipped in an external server. Additionally, in the specification, it does not necessarily represent that each step is performed according to the time sequence.

To begin with, the step of determining the target's initial position is performed (S100). In the step S100, the target's initial position and the confidence level is determined based on the satellite navigation system information (including all information that may be outputted by the common satellite navigation receiver such as DGPS, CDGPS, RTK, Network-RTK, PPP, etc.) received by the satellite navigation system information receiver. In an embodiment, additional information (DR information, visual information, map information, a radio wave signal, etc.) acquired through the additional sensor may be combined to determine the more accurate initial position and confidence level.

Subsequently, the step of acquiring the TDCP measurement by time-differencing the carrier phase measurement received through the satellite navigation system information receiver between consecutive times is performed (S200). The process of calculating the time-differenced measurement may use the above-described Equations 1 to 3, and the integer ambiguity term of the carrier phase measurement is eliminated through time-differencing. The acquired TDCP value is used to determine the target's relative position through the following process.

Subsequently, the step of detecting a change of integer ambiguity in the carrier phase measurement is performed (S300). To use the TDCP measurement, the continuity of integer ambiguity over time should be guaranteed, and this is because the integer ambiguity is eliminated by time-differencing on the premise that the integer ambiguity term has a constant value that is time-invariant. In this step (300), when a discontinuous measurement phenomenon (a cycle slip) is detected, the measurements of the corresponding satellite are excluded from the relative position determination process, or may be used after estimating and compensating the change of integer ambiguity. In this process, it is possible to improve the performance using additional sensors, multi-constellation, multi-frequency measurements as described above. It is expected to improve the navigation performance with the increasing visible satellites by estimating and compensating the magnitude of change of integer ambiguity.

Subsequently, the step of determining the target's relative position (S400) is performed. In the step S400, the target's relative position may be determined based on the TDCP measurement, and as shown in FIG. 4, a value corresponding to a difference between the position of the target (the user) at $t_1$ and the position of the target at $t_2$, i.e., a movement distance, may be calculated based on the above-described Equations 1 to 6.

Subsequently, the step of determining the target's absolute position (the current position) by accumulating the relative position over time from the target's initial position (S500) is performed. Specifically, the absolute position may be determined by accumulating the relative position $\Delta \bar{r}_u$ calculated using the TDCP measurement from the initial position $\bar{r}_u(0)$ as shown in Equation 7. According to this, the current position (the absolute position) may be estimated by adding the target's movement distance (the relative position) over time to the target's initial position (likewise, the absolute position).

In an embodiment, the step of determining the confidence level for the target's determined relative position or absolute position based on the TDCP measurement may be further performed. In an embodiment, integrity may be monitored by applying the TDCP measurement based Relative RAIM (RRAIM) method, and it is possible to provide sufficient performance even in case that visible satellites lack, thereby improving the confidence level of the positioning algorithm in a deep urban environment. As described above, the optimal confidence level may be calculated by combining the accelerometer or gyroscope based estimated position information with the satellite navigation system information using a Kalman filter (a filter primarily used to build an integration navigation system by combining the satellite navigation system information with INS).

The position measurement method according to an embodiment may be implemented as an application or in the format of program instructions that may be executed through a variety of computer components and may be recorded in computer readable recording media. The computer readable recording media may include program instructions, data files and data structures alone or in combination. Examples of the computer readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

According to an embodiment of the TDCP based navigation system and the position measurement method described above, as opposed to the existing navigation systems, since the target's position is determined based on the TDCP measurements, it is possible to determine the target's position using the carrier phase measurements without calculating the integer ambiguity. Accordingly, using the low-cost satellite navigation system information receiver, it is possible to achieve precise position measurement with cm level of error and reduce the time and cost required to determine the integer ambiguity.

Additionally, as opposed to the existing absolute navigation systems, it is possible to prevent a navigation solution jump (discontinuous trajectory) phenomenon caused by changes in visible satellites, and the introduction of the RRAIM method makes it possible to monitor the integrity of the positioning algorithm in an urban environment in which visible satellites lack.

Although the present disclosure has been hereinabove described with regard to the embodiments, those skilled in the art will understand that a variety of modifications and changes may be made to the present disclosure without departing from the spirit and scope of the present disclosure described in the appended claims.

The invention claimed is:

1. A time-differenced carrier phase (TDCP) measurement-based navigation system, comprising:
a satellite navigation system information reception unit to acquire satellite navigation system information including carrier phase measurement;
an initial position determination unit to determine an initial position of a target based on the satellite navigation system information;
a TDCP acquisition unit to acquire a TDCP measurement by time-differencing the carrier phase measurement between consecutive times;
an integer ambiguity change detection unit to detect a change of integer ambiguity in the carrier phase measurement;
a relative position determination unit to determine a relative position of the target based on the TDCP measurement; and
an absolute position determination unit to determine an absolute position of the target by accumulating the relative position over time from the initial position of the target,
wherein when the change of integer ambiguity in the carrier phase measurement is detected, the relative position determination unit is configured to perform one of exclude the carrier phase measurement and its time-differenced measurement in determining the relative position, and estimate a magnitude of the change of integer ambiguity and compensate the measurement for the corresponding magnitude for use to determine the relative position,
wherein the system determines a position of the target using the TDCP measurement without determining the integer ambiguity.

2. The TDCP measurement-based navigation system according to claim 1, further comprising:
a confidence level determination unit to determine a confidence level for the determined relative position or an absolute position of the target based on the TDCP measurement.

3. The TDCP measurement-based navigation system according to claim 1, further comprising:
an additional information reception unit to acquire additional information other than the satellite navigation system information,
wherein the initial position determination unit determines the initial position of the target further based on the additional information.

4. The TDCP measurement-based navigation system according to claim 1, further comprising:
an additional information reception unit to acquire additional information other than the satellite navigation system information,
wherein the relative position determination unit determines the relative position of the target further based on the additional information.

5. The TDCP measurement-based navigation system according to claim 2, further comprising:
an additional information reception unit to acquire additional information other than the satellite navigation system information,
wherein the confidence level determination unit determines the confidence level for the relative position or the absolute position of the target further based on the additional information.

6. The TDCP measurement-based navigation system according to claim 1, further comprising:
an additional information reception unit to acquire additional information other than the satellite navigation system information,
wherein the relative position determination unit estimates a magnitude of the change of integer ambiguity based on the additional information.

7. The TDCP measurement-based navigation system according to claim 6, wherein the additional information includes at least one of dead rocking (DR) information received from a DR sensor, visual information received from a vision sensor, radio wave positioning information received from a radio wave positioning sensor or correction information received from a reference station.

8. The TDCP measurement-based navigation system according to claim 1, wherein the satellite navigation system information includes multi-frequency information and multi-constellation information.

9. A time-differenced carrier phase (TDCP) measurement-based navigation system, comprising:
a satellite navigation system information reception unit to acquire satellite navigation system information including carrier phase measurement;
an initial position determination unit to determine an initial position of a target based on the satellite navigation system information;
a TDCP acquisition unit to acquire TDCP measurement by time-differencing the carrier phase measurement between consecutive times;
an integer ambiguity change detection unit to detect a change of integer ambiguity in the carrier phase measurement;
a relative measurement calculation unit to calculate a relative measurement over time based on the TDCP measurement; and
a current position determination unit to determine a current position of the target based on the initial position of the target and the relative measurement accumulated over time,
wherein when the change of integer ambiguity in the carrier phase measurement is detected, the relative measurement calculation unit is configured to perform one of exclude the carrier phase measurement and its time-differenced measurement in determining the relative position, and estimate a magnitude of the change of integer ambiguity and compensate the measurement for the corresponding magnitude for use to determine the relative measurement,
wherein the system determines a position of the target using the TDCP measurement without determining the integer ambiguity.

10. A time-differenced carrier phase (TDCP) measurement-based position measurement method performed by a computer processor, the method comprising:
determining an initial position of a target;
acquiring a TDCP measurement by time-differencing carrier phase measurement received through a satellite navigation system information reception unit between consecutive times;
detecting a change of integer ambiguity in the carrier phase measurement before determining the relative position of the target;
determining a relative position of the target based on the TDCP measurement; and determining an absolute position of the target by accumulating the relative position of the target over time from the initial position of the target, wherein when the change of integer ambiguity in the carrier phase measurement is detected, one of the carrier phase measurement and its time-differenced measurement are excluded in determining the relative position of the target and the estimate a magnitude of the change of integer ambiguity and compensate the measurement for the corresponding magnitude, wherein the method determines a position of the target using the TDCP measurement without determining the integer ambiguity.

11. The TDCP measurement-based position measurement method according to claim 10, further comprising:

determining a confidence level for the determined relative position or absolute position of the target based on the TDCP measurement.

12. The TDCP measurement-based position measurement method according to claim 11, further comprising:

acquiring additional information other than the satellite navigation system information, wherein the additional information includes at least one of DR information received from a dead reckoning (DR) sensor, visual information received from a vision sensor, radio wave positioning information received from a radio wave positioning sensor or correction information received from a reference station.

13. The TDCP measurement-based position measurement method according to claim 12, wherein each of determining the initial position of the target, determining the relative position of the target, detecting the change of integer ambiguity, determining the confidence level for the relative position or the absolute position of the target, and estimating the magnitude of the change of integer ambiguity is performed further using the additional information.

* * * * *